Aug. 5, 1941.
H. P. GOULD ET AL
2,251,567
WHEELED VEHICLE AND STEERING CASTER THEREFOR
Filed Oct. 3, 1938
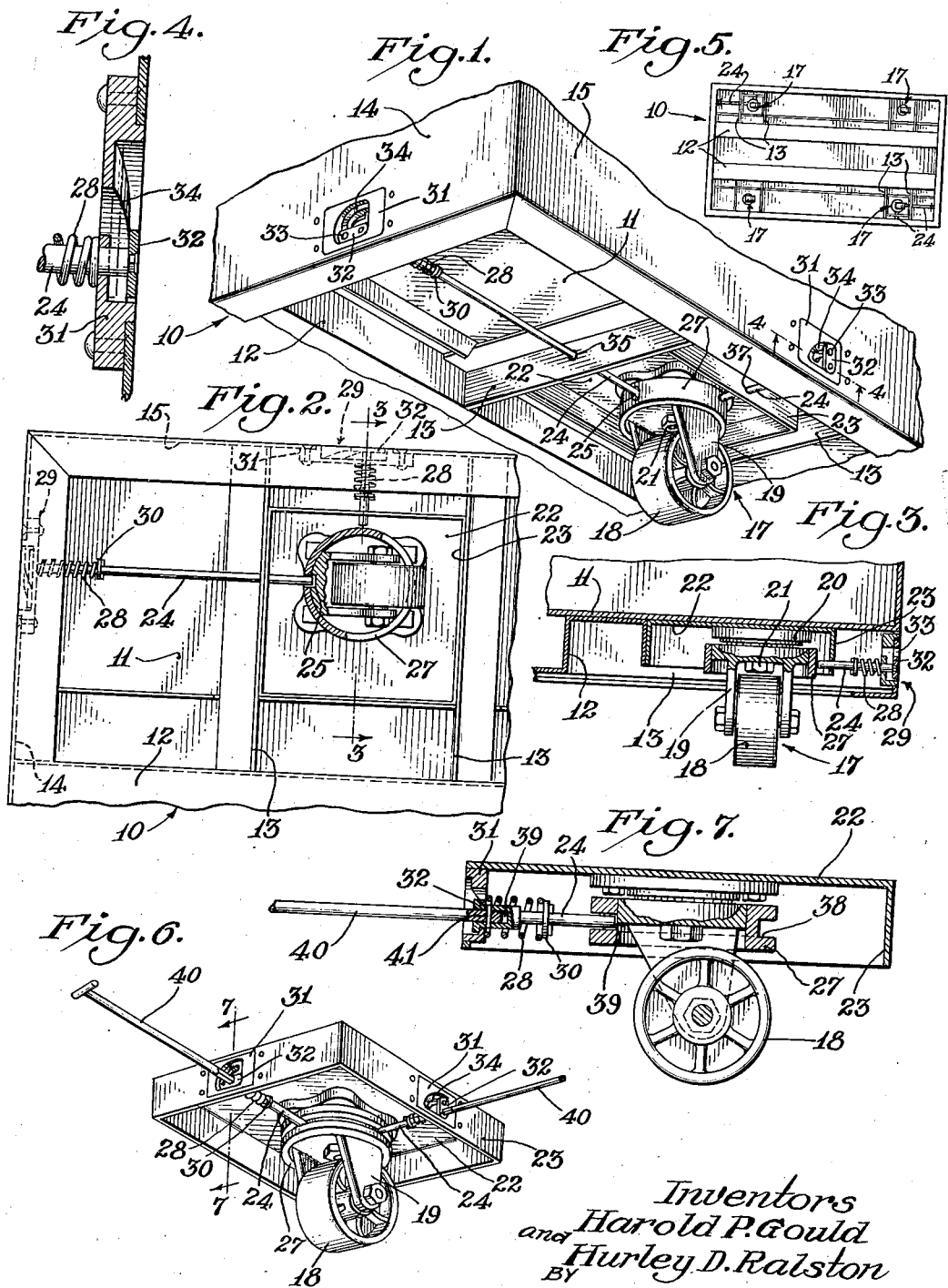
Inventors
Harold P. Gould and
Hurley D. Ralston
BY
Parker, Carlson, Pitzner & Hubbard
Attorneys.

Patented Aug. 5, 1941

2,251,567

UNITED STATES PATENT OFFICE 2,251,567

WHEELED VEHICLE AND STEERING CASTER THEREFOR

Harold P. Gould, Riverside, and Hurley D. Ralston, Oak Park, Ill., assignors, by direct and mesne assignments, to said Hurley D. Ralston Application October 3, 1938, Serial No. 232,994

3 Claims. (Cl. 16—35)

This invention relates to an improved vehicle and caster construction and is more particularly concerned with a vehicle having one or more steering casters adapted to be locked in selective pivotal positions against swiveling so as to enable directional guidance of the vehicle in shifting it from place to place.

A general object of the invention is to provide a vehicle and combined steering caster of simple sturdy and inexpensive construction wherein the caster can be quickly and easily locked against swiveling to control the direction of movement of the vehicle selectively in a positive and efficient manner.

Another object is to provide a vehicle and steering caster construction having the foregoing general characteristics in which the caster is mounted in a novel load distributing relation to the bottom of the vehicle and the bottom frame structure of the vehicle supports a plurality of independent locking elements selectively operable for locking the caster in different unidirectional steering positions.

A further object of the invention is to provide a steering caster and directional locking means which will permit the caster either to swivel freely or will, upon appropriate setting or conditioning, automatically lock it for unidirectional travel in any selected one of a plurality of predetermined directions; and which cannot accidentally lock the caster for travel in another direction.

Still another object of the invention is to provide locking means for the casters of wheeled vehicles which, although conveniently available for manipulation into or out of locking position, is free of outwardly protruding parts that might be damaged by contact with extraneous objects perchance engaging or closely approaching the vehicle adjacent to the locking means.

Yet another object of the invention is to provide a caster and directional locking means therefor adapted for use on vehicles of low base clearance.

An additional object of the invention is to provide a caster and directional locking means associated in a novel self-contained unit which is readily adaptable to many structural environments.

Other objects and advantages will become apparent in the following description and from the accompanying drawing in which:

Figure 1 is a fragmentary bottom perspective view of one corner of a vehicle and a steering caster embodying the principles of the invention.

Fig. 2 is a bottom plan view of that portion of the vehicle shown in Fig. 1 with certain parts of the caster structure shown in section.

Fig. 3 is a vertical sectional view through the caster taken substantially along the line 3—3 of Fig. 2.

Fig. 4 is a fragmentary horizontal sectional view taken substantially in the plane of line 4—4 of Fig. 1.

Fig. 5 is a diagrammatic bottom plan view of a container showing the relationship of the several casters thereof.

Fig. 6 is a bottom perspective view of a slightly modified form of the invention.

Fig. 7 is a vertical transverse sectional view through the modified form taken substantially along line 7—7 of Fig. 6.

While the invention is susceptible of various modifications and alternative constructions, we have shown in the drawing and will herein describe in detail certain preferred embodiments, but it is to be understood that we do not thereby intend to limit the invention to the specific forms disclosed but intend to cover all modifications and alternative constructions falling within the spirit and scope of the invention as expressed in the appended claims.

According to the present invention, a novel wheeled vehicle and steering caster construction is provided wherein the caster is mounted in an improved manner to permit large size, unusually light-weight construction of the vehicle while enabling heavy loads to be carried thereby without strain or undue stress upon any part of the structure, an improved reinforcement of the base structure of the vehicle assuring adequate distribution of the load upon the caster from a large area of the base structure. The base structure of the vehicle is also utilized advantageously to support means including a plurality of locking members by which the caster can be locked in any one of a plurality of selective unidirectional steering positions. By actuating a selected locking member it will automatically assume caster-locking position upon swiveling of the caster into the selected unidirectional steering position. Upon release of the locking member the caster may again swivel freely until the same or another locking member is moved to locking position.

Referring now to the exemplary embodiment of the invention shown in Figs. 1 to 5, inclusive, a vehicle, indicated generally by the numeral 10, which may be a mobile merchandise or freight container or the like is constructed with a rectangular base frame structure including a bottom wall 11. This bottom wall may be formed of relatively thin sheet metal and is therefore suitably reinforced as by means of flanged longitudinal sheet metal beams 12 and transverse angle iron ribs 13. As indicated (Fig. 5) there may be a spaced parallel pair of the beams 12 and the ribs 13 may be located in spaced parallel pairs perpendicular to the beams 12 adjacent to each corner of the container. At their inner ends the ribs 13 cooperate structurally with the beams 12. The outer ends of the beams and the ribs respectively interengage fixedly with portions of vertical end and side walls 14 and 15 on the vehicle which preferably depend a limited distance below the bottom wall 11, and in effect form part of the base frame structure. This provides a shallow clearance between the bottom wall 11 and the plane of the lower edges of the end and side walls within which may be received the swivel mounts of a set of suitable casters, individually identified by the general numeral 17. Preferably, one caster 17 is provided at least adjacent to each corner of the bottom frame structure of the vehicle (Fig. 5).

In general, the casters 17 may all be of an identical preferred construction, each one including a wheel 18 supported rotatably in the usual manner on a horizontal axis by a swivel yoke 19 which bears pivotally against a head plate 20. A vertical stud shaft or pintle 21 connects the swivel yoke 19 and the head plate 20 for free relative rotary movement. In the present instance, the head plate 20 is secured fixedly to the lower face of a mounting plate 22 of relatively larger dimensions and preferably marginally flanged as indicated at 23 to assume the form of a shallow, rectangular inverted pan.

In mounting the casters 17 upon the vehicle 10, they are preferably respectively located in the rectangular spaces defined between the flanges of the pairs of ribs 13 at each corner of the bottom frame of the vehicle, and the flanges 23 are secured as by welding or the like to the rib flanges. As a result, the weight of the vehicle is nicely distributed over the base frame and because of the manner in which the casters 17 are mounted, the widely separated points of support accorded thereby will not impose undue strain upon any part of the structure. Moreover, this construction permits the casters 17 to be of relatively small size compared with the size of the vehicle and the load which can be handled, thus keeping the necessary base clearance of the vehicle at a minimum. For example, in an actual rigorous test use of the invention satisfactory results have been obtained by the use of only four casters requiring no more than 6 inches overall clearance between the bottom of the vehicle and the floor, on a vehicle having base dimensions of approximately 80 by 52 inches and a proven capacity for easily transporting a load of about a ton and a half of merchandise without noticeable strain.

In shifting the vehicle 10 manually, especially when it is loaded, it is generally desirable to steer a straight course in the chosen direction. However, without some means to restrain their free swiveling movement, the casters 17 may be affected by surface unevennesses or slight obstructions upon the floor or by off-center pushing force applied to the vehicle to cause veering from the path. Herein, effective steering control is secured by locking against swiveling at least one of the casters 17 at the opposite side or end of the vehicle from that against which the pushing force is applied, each of the steering casters being provided with means for locking it in one of two selective steering positions. Preferably the steering casters are located at diagonally opposite corners of the vehicle.

According to the present invention, the locking means for the steering casters is so constructed that it can be supported and actuated in the small clearance between the bottom wall 11 and the plane of the lower edges of the end and side walls 14 and 15. In one preferred form, the locking means includes a plurality of locking rods 24 arranged to project inwardly radially toward the swivel axis of the associated caster to engage at their inner ends within a single radially outwardly opening locking recess 25 which may be formed in the periphery of an engagement member 27 carried by the swivel member 19 of the caster. As shown, the engagement member 27 may be in the form of a coaxial ring-like collar secured to or formed integrally with the swivel member 19 and providing an annular peripheral bearing surface against which the ends of the locking rods 24 may abut perpendicularly and slidably. If the locking recess 25 is not in register with the inner end of the selected rod, then the swivel movement of the caster will eventually effect such registration. The locking recess 25 is preferably located in the vertical median plane of the caster wheel 18 at the extreme advance point of the engagement collar periphery. Moreover, the recess 25 is preferably elongated vertically so as to allow for slight off-axial inaccuracies in the locking ends of the rods 24.

Each of the locking rods 24 is adapted to lock its associated caster in one selected unidirectional steering position. Accordingly, one of the rods 24 may be located longitudinally of the vehicle 10 to project inwardly from the depending portion of the end wall 14 and the other locking rod may be located on an axis at right angles to the longitudinal rod to project inwardly from the associated depending side wall 15. Moreover, each rod is preferably equipped with means for selectively moving the rod into or out of locking position. In the present instance, such means is preferably identical for each rod and includes a compression spring 28 for normally urging the rod into locking position, and means generally indicated at 29, adapted to act in opposition to the spring 28 to release and hold the rod in its inactive or non-locking position. As shown, the spring 28 may be compressed between a collar 30 on its rod 24 and the inner face of a bearing block 31 which forms part of the releasing means 29 and serves as a bearing for the outer end portion of the locking rod.

A handle 32 in the form of a short, flat plate is secured rigidly to the outer end of the rod 24 to project laterally thereof so that when an aperture 33 near its remote end is digitally engaged, the handle can readily be swung in an arc to rotate the locking rod. When thus swung, the handle 32 will ride up or down a cam surface 34 formed in the outer face of the bearing block 31, whereby respectively to draw the rod longitudinally or axially outwardly against the compression of the spring 28 or to allow the rod to move axially inwardly into locking position under the influence of the spring.

Preferably, the cam surface 34 is recessed into the bearing block 31 sufficiently to have the outer face of the handle 32 always within the outer face plane of the block. Furthermore, the bearing block 31 may be secured in a substantially flush relation to the associated end wall 14 or side wall 15, as the case may be. Thus, there will be no projecting part of the rod-actuating mechanism to be damaged by extraneous objects against which the outer walls of the vehicle may contact.

In addition to the bearing support afforded the outer end of the longitudinal locking rod 24 by its bearing block 31, the inner portion of the rod may be supported slidably by the nearest one of the transverse ribs 13 which is provided for this purpose with a bearing aperture 35. The transverse locking rod 24 may be supported in part by the adjacent flange 23 of the caster supporting base pan which for this purpose is formed with a bearing aperture 37.

It will thus be seen that when it is desired to wheel the vehicle 10 in either endwise direction, unidirectional steering control will be had by moving the longitudinal locking rod 24 of the steering caster at the advance end of the vehicle into locking position. Then, if the locking recess 25 is not in register with the inner end of the locking rod, proper registration will take place automatically as an incident to swiveling of the caster into the position that it will assume when the vehicle is moved forward axially of the locking rod. At the time that the chosen longitudinal locking rod 24 is moved to its locking position, all of the other locking rods should be moved to or remain in their non-locking positions. Thereafter, if it is desired to reverse the direction of movement of the vehicle or to shift it sidewise in either direction, the longitudinal locking rod will be released, and that locking rod which is axially disposed in the direction in which it is desired to shift the vehicle will be actuated to assume locking position. When desired, of course, all of the locking rods may be released and the casters permitted to rotate or to swivel freely. Since only one of the steering casters at a time is locked for steering purposes, the vehicle can be easily pivoted thereabout when necessary, thus additionally facilitating control over movements of the vehicle.

The steering caster and locking means may also be constructed as a self-contained unit, the assembly, for example, taking the form shown in Figs. 6 and 7. In this form, the mounting pan 22 serves to support the right angularly related locking rods 24 so that the lock-controlling means 29 of the latter will be easily accessible should the outer flanges 23 of the mounting pan be located in the extreme corners of the base structure of the vehicle. For this purpose the bearing blocks 31 for the rods may be supported by the respective flanges 23 and the inner ends of the locking rods 24 may be supported within an annular peripheral groove 38 in the locking collar 27 of the caster. A locking recess 39 in the groove 38 will receive the inner end of the particular locking rod selected for engagement therein.

In order to adapt the self-contained caster unit for uses where direct access to the rod-actuating handles 32 may not be practicable, the outer end of each of the locking rods 24 may be provided with an axially recessed enlargement or head 39 into which the squared inner end of an extension rod 40 may be fitted fixedly to enable rotation of the associated locking rod. If desired, the extension rods may be pinned in place as indicated at 41 in Fig. 7.

From the foregoing it will be apparent that we have provided a novel wheeled vehicle and steering caster construction of simple, practical form in which the novel relationship of the reinforced base frame of the vehicle and the caster are such as to secure a uniform load distribution for the bottom of the vehicle and to permit the attainment of an exceptionally low bottom clearance for the vehicle. The individual locking elements for the caster are easily and quickly manipulable to select the desired unidirectional steering position which the caster should assume in the forward movement of the vehicle. Accidental locking of the caster in any other than the desired steering position is obviated because there is only a single locking recess into which the selected locking element of the caster can engage even though the caster must make a substantially complete swivel rotation before the element registers with the recess. Furthermore, the steering caster construction is readily adaptable for mounting in any desired location on the associated vehicle.

We claim as our invention:

1. A vehicle caster construction of the character described comprising, in combination, a swivel member including a coaxial bearing surface having a radial recess therein, means for supporting said caster including a part depending therefrom in spaced relation to said bearing surface, a locking rod extending from said depending portion toward engagement with said bearing surface, a spring coactive with said rod to urge the inner end of the rod into engagement with said bearing surface to enter said recess upon rotation of the swivel member to bring the recess into registration with said inner end of the rod, manipulating means on the outer end of the rod, and means carried by said depending portion coactive with said manipulating means in one position of the manipulating means to hold said rod out of engagement with said bearing surface in opposition to the force of said spring.

2. A vehicle caster of the character described comprising, in combination, a swivel member having an annular collar thereon, a circumferential groove in said collar having a radial recess at one point therein, a locking element having locking and non-locking positions adapted to ride in said groove in said non-locking position and adapted to enter said recess in said locking position to hold the caster against swiveling, and means spaced from said collar to provide an additional support for said locking element.

3. A vehicle caster of the character described comprising, in combination, a swivel member including a portion having an outwardly opening recess therein, a locking rod extending toward said swivel member and adapted to engage within said recess at its inner end, a spring acting normally to urge said rod into locking position, means for manipulating said rod, a cam surface adjacent to one portion of said rod and facing in the direction of the rod axis, and means on said rod coactive with said cam surface for holding said rod out of locking position in opposition to said spring in one position thereof to which it may be moved by said manipulating means.

HAROLD P. GOULD.
HURLEY D. RALSTON.

CERTIFICATE OF CORRECTION.

Patent No. 2,251,567. August 5, 1941.

HAROLD P. GOULD, ET AL.

It is hereby certified that the above numbered patent was erroneously issued to "Hurley D. Ralston" as assignee, by direct and mesne assignments, of the entire interest therein, whereas said patent should have been issued to the inventors, Harold P. Gould, of Riverside, and Hurley D. Ralston, of Oak Park, Illinois, as shown by the records of this office; page 2, first column, line 51, for "accorded" read --afforded--; and that the said Letters Patent should be read with this correction therein that the same may conform to the record of the case in the Patent Office.

Signed and sealed this 30th day of September, A. D. 1941.

(Seal)

Henry Van Arsdale,
Acting Commissioner of Patents.